United States Patent
Ferencz et al.

(10) Patent No.: US 6,678,175 B1
(45) Date of Patent: Jan. 13, 2004

(54) UTILIZING CHARGE STORED IN A SNUBBER CAPACITATOR IN A SWITCHING CIRCUIT

(75) Inventors: Andrew Ferencz, Southborough, MA (US); Gregory A. Zvonar, Winchester, MA (US); William Ng, Leominister, MA (US); Bernhard Schroter, Upton, MA (US)

(73) Assignee: Galaxy Power, Inc., Westborough, MA (US)

( * ) Notice: Subject to any disclaimer, the term of this patent is extended or adjusted under 35 U.S.C. 154(b) by 0 days.

(21) Appl. No.: 10/219,204

(22) Filed: Aug. 15, 2002

(51) Int. Cl.[7] .............................................. H02H 7/122
(52) U.S. Cl. ..................... 363/56.01; 363/131; 323/288; 323/363
(58) Field of Search .................. 363/17, 55, 56.12, 363/98, 132, 16, 97, 131, 56.01; 323/288, 290, 363

(56) References Cited

U.S. PATENT DOCUMENTS

| | | | | |
|---|---|---|---|---|
| 5,260,607 A | * | 11/1993 | Kinbara ........................ 327/427 |
| 6,005,782 A | * | 12/1999 | Jain et al. ................. 363/21.12 |
| 6,417,629 B1 | * | 7/2002 | Qian et al. .................... 315/219 |
| 6,580,259 B2 | * | 6/2003 | Liu et al. ....................... 323/282 |

* cited by examiner

*Primary Examiner*—Michael Sherry
*Assistant Examiner*—Gary L. Laxton
(74) *Attorney, Agent, or Firm*—Cesari and McKenna, LLP

(57) ABSTRACT

The invention replaces a snubber resistor with a two diodes and a load. The electric charge stored in the snubber capacitor on each cycle of the switch is then caused by a first diode to flow through the load, rather than to flow through a snubber resistor. A second diode provides a charging path for the snubber capacitor. The load uses the electric power which would be wasted in the snubber resistor.

10 Claims, 6 Drawing Sheets

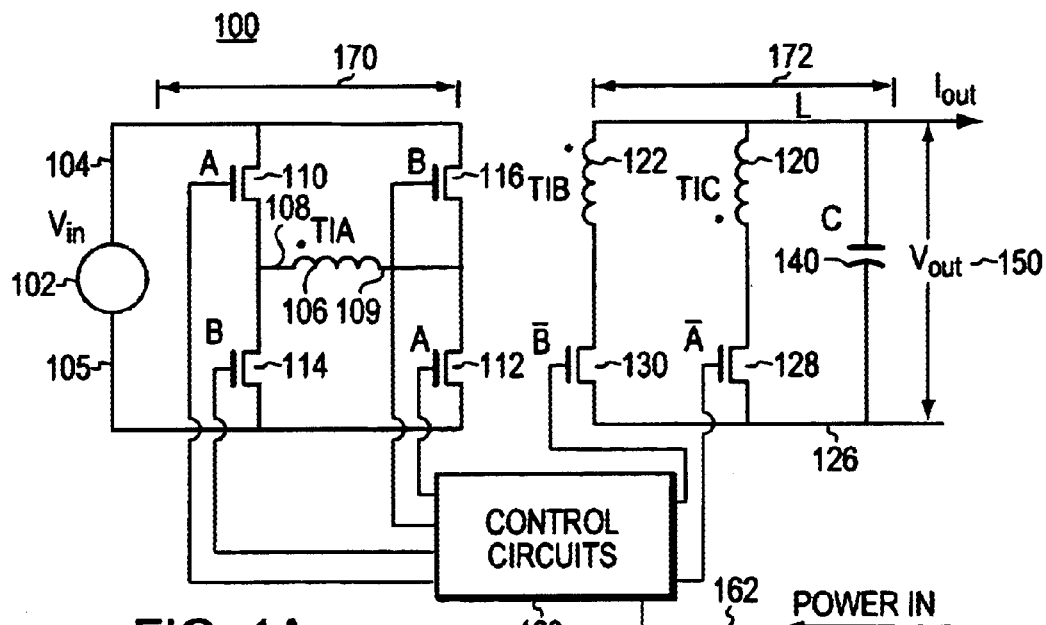
FIG. 1A
PRIOR ART
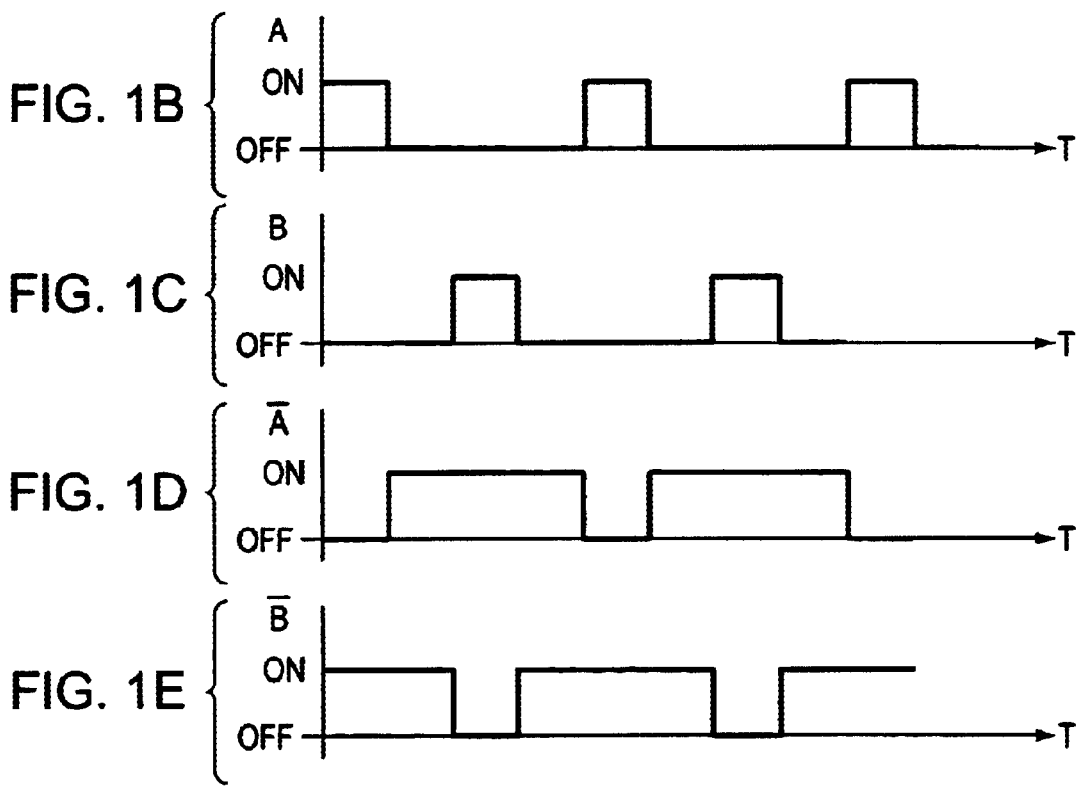
PRIOR ART

UTILIZING CHARGE STORED IN A SNUBBER CAPACITOR IN A SWITCHING CIRCUIT

BACKGROUND OF THE INVENTION

1. Field of the Invention

This Invention relates to the use of a snubber capacitor in a switching circuit, and more particularly to the use of a snubber capacitor in an electronic switching power supply.

2. Background Information

A switching circuit often develops ringing because of stray capacitance and stray inductance. Abruptly switching power to a circuit with stray capacitance and stray inductance leads to electric oscillation at the natural resonant frequency of the capacitance and inductance. The oscillation is referred to as "ringing" in the circuit. Ringing usually occurs in a circuit when a switch supplying electric power to the circuit is either closed or opened.

In order to reduce ringing in a switching circuit, a capacitor in series with a resistor is often connected across the switch. The resistor dissipates the power of the oscillations, and the capacitor prevents a steady current flow through the resistor when voltage is applied across the resistor. The capacitor is referred to as a "snubber capacitor", and the resistor is referred to as a "snubber resistor".

A problem in a switching circuit in which the switch is closed and opened many times per second is that a considerable amount of power may be dissipated in the snubber resistor. Each time the switch is closed, the snubber capacitor charges up to the value of the applied DC voltage. Then, when the switch is opened, the snubber capacitor discharges through the snubber resistor, and perhaps through the stray capacitance. The charge stored in the capacitor is given by the product CV, where C is the capacitance and V is the voltage to which the capacitance is charged. Thus, on each closure of the switch, an amount of charge equal to CV is wasted. The amount of energy stored in a capacitor is given by ½ CV². Thus, this amount of energy is wasted each time that the switch is closed and then opened.

The amount of energy wasted in a snubber capacitor becomes of concern when the switch is opened and closed many times per second. For example, in a switching power supply used for DC to DC conversion, the switches may operate in the frequency range of 100 kilohertz to 1000 kilohertz, or higher. Such rapid opening and closing of the switches, and consequently such rapid charging and discharging of the snubber capacitor, causes a significant waste of power through discharge of the snubber capacitor many times per second.

There is needed a method of suppressing oscillations in an electric circuit which does not waste considerable amounts of power during operation of a switch, especially when the switch rapidly closes and opens.

SUMMARY OF THE INVENTION

The invention replaces the snubber resistor with a two diodes and a load. The electric charge stored in the snubber capacitor on each cycle of the switch is then caused by a first diode to flow through the load, rather than to flow through a snubber resistor. A second diode provides a charging path for the snubber capacitor. The load uses the electric power which would be wasted in the snubber resistor.

In an aspect of the invention, two sets of snubber capacitors and diode pairs are used to reduce ringing in a synchronous switching power supply. For example, field effect transistors (FETs) are used to switch the primary of a transformer in a switching DC to DC converter, and a snubber capacitor along with a pair of diodes is used on each end of the primary winding of the transformer to both reduce ringing in the primary circuit, and to supply power from electric charge stored in the snubber capacitors. For example, the power recovered from the snubber capacitors may be supplied to control circuits which operate the DC to DC converter, etc.

The above and further advantages of the invention may be better understood by referring to the following description in conjunction with the accompanying drawings, in which like reference numbers indicate identical or functionally similar elements.

BRIEF DESCRIPTION OF THE DRAWINGS

The invention description below refers to the accompanying drawings, of which:

FIG. 1A is a block schematic drawing of a switching power supply;

FIG. 1B–FIG. 1E are graphs showing signals within a switching power supply;

DETAILED DESCRIPTION OF AN ILLUSTRATIVE EMBODIMENT

Figure 2A:
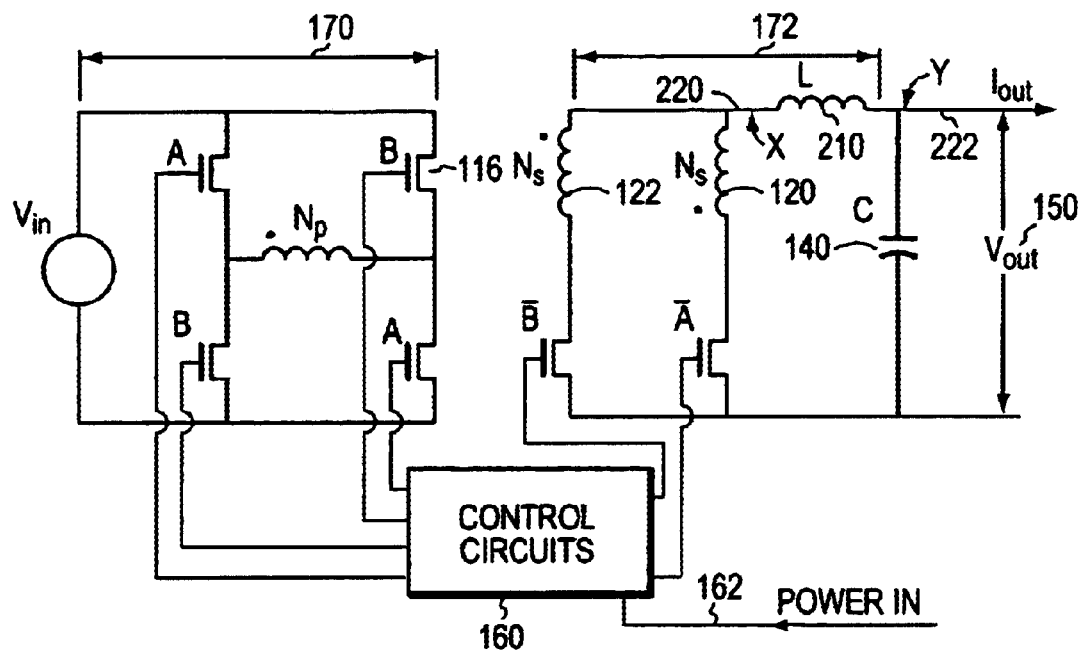
FIG. 2A is a block schematic drawing of a switching power supply.

Turning now to FIG. 1A, operation of the switches in a synchronous switched DC to DC converter power supply 100 is shown. In an exemplary embodiment of the invention, a Field Effect Transistor (FET) is used for each switch. Thus the power supply is referred generically as a synch FET power supply. As will be evident to those skilled in the art, any type of convenient switch can be used, and the name "synch FET power supply" does not limit the invention to the use of FETs as switches.

Direct Current (DC) power source 102 supplies power at an input voltage $V_{in}$ on positive input bus 104 and negative input bus 105. In a first half cycle, transformer primary winding 106 is connected so that the "dotted" end 108 of the primary winding is first connected to the positive bus 104 through switch 110 and the un-dotted end 109 is connected to the negative input bus 105 through switch 112. Current then flows through the primary winding from the dotted end to the un-dotted end.

During a second half cycle, transformer primary winding 106 is connected so that the "dotted" end 108 of the primary winding is connected to the negative input bus 105 through switch 114 and the un-dotted end 109 is connected to the positive input bus 104 through switch 116. Current flow through the primary winding is then "in" at the un-dotted end and "out" through the dotted end.

Switches 110 and 112 are marked as the "A" switches because they close simultaneously. Further, switches 114 and 116 are marked as the "B" switches because they close simultaneously. FIG. 1B is a graph showing the "on" times of the A switches, 110 and 112. FIG. 1C is a graph showing the "on" times of the "B" switches 114 and 116.

Turning now to the secondary circuits, there are two secondary windings 120 and 122. The two secondary windings are joined at the positive output bus 124. Secondary 120 is connected at its dotted end to the negative output bus 126 by switch 128. Secondary 122 is connected at its un-dotted end to negative output bus 126 by switch 130.

Switch 128 is marked as "not A" because it is turned off when the A switches are on, and is turned on when the A switches are turned off. Switch 130 is marked as "not B" because it is turned off when the B switches are on, and is turned on when the B switches are turned off.

Turning now to FIG. 1D, there is a graph showing when "not A" switch 128 is turned on. Note that switch 128 is on when the A switches shown in FIG. 1B are off, and switch 128 is off when the A switches of FIG. 1B are on.

Turning now to FIG. 1E, there is a graph showing when "not B" switch 130 is turned on. Note that switch 130 is on when the B switches shown in FIG. 1C are off, and switch 130 is off when the B switches of FIG. 1C are on.

A DC output voltage 150 is produced between the positive output bus 124 and negative output bus 126, and is shown as $V_{out}$ 150. The output current is indicated as $I_{out}$.

A filter capacitor C 140 is shown. Filter capacitor C 140 reduces the ripple voltage in the DC output delivered between positive output bus 124 and negative output bus 126.

Control circuits 160 supply the pulses shown in FIG. 1B, FIG. 1C, FIG. 1D, and FIG. 1E for turning the switches 110, 112, 114, 116, 128, 130 on and off. Power is supplied to control circuits 160 through power line 162.

The primary part 170 of the circuit includes the primary winding 106 of the transformer, the primary switches 110, 112, 114, 116, etc. The secondary part 172 of the circuit includes the secondary windings 120, 122 of the transformer, the secondary switches 128, 130, etc.

Turning now to FIG. 2A, there is shown a synch FET power supply 200 similar to synch FET power supply 100. Synch FET power supply 200 has the addition of a filter inductor 210. Filter inductor 210 reduces the ripple in the output DC voltage below that achieved by capacitor C 140 only.

The primary part of the circuit 170, as shown, is identical to the primary circuit of FIG. 1. However, the secondary part 172A of the circuit has as an additional component the filter inductor 210.

Figure 2B:
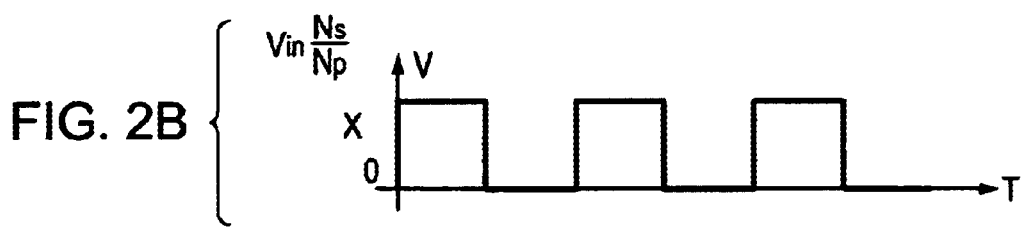
FIG. 2B–FIG. 2C are graphs showing voltages within a power supply.

FIG. 2B is a graph 230 giving the voltage observed at point X. Graph 230 shows the output voltage fluctuating between the value of "0" and the high value given by the ratio of the number of turns in the primary and the secondary windings, times the input voltage. That is, the voltage at point X 220 varies between zero and:

$$V(\text{input})*(\text{Number of secondary Turns})/(\text{Number of Primary Turns})$$

Figure 2C:
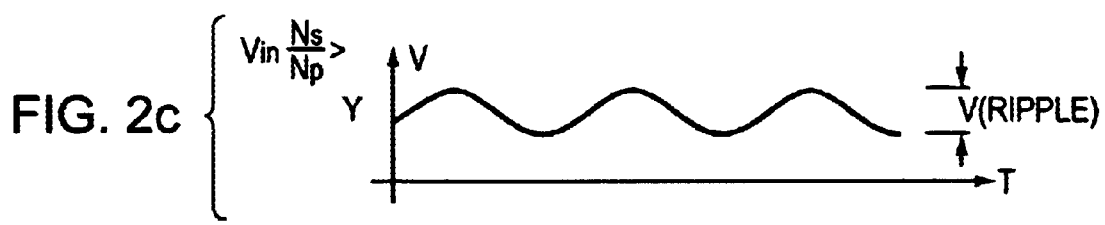

Turning now to FIG. 2C, a time average voltage observed at point Y 222, the output voltage, is shown. Rather than fluctuating between zero and another value, the voltage at point Y 222 has a steady DC component and a time varying component designated as ripple voltage 240. Introduction of filter inductor 210 reduces the ripple voltage to below that produced by the synch FET power supply 100, which does not have a filter inductor.

The output voltage 150 produced depends on a number of factors, including the input voltage $V_{in}$ between positive input bus 104 and negative input bus 105.

The output voltage is given approximately by the expression:

$$V(\text{input})*(\text{Number of secondary Turns})/(\text{Number of Primary Turns})*(T(\text{on})/T)$$

Here, T(on)/T is the duty cycle of the current flow through the primary winding 106 of the transformer. T(on) is the time that current flow is on while a set of primary switches is closed, and T is the length, in time, of a cycle.

Figure 3A:
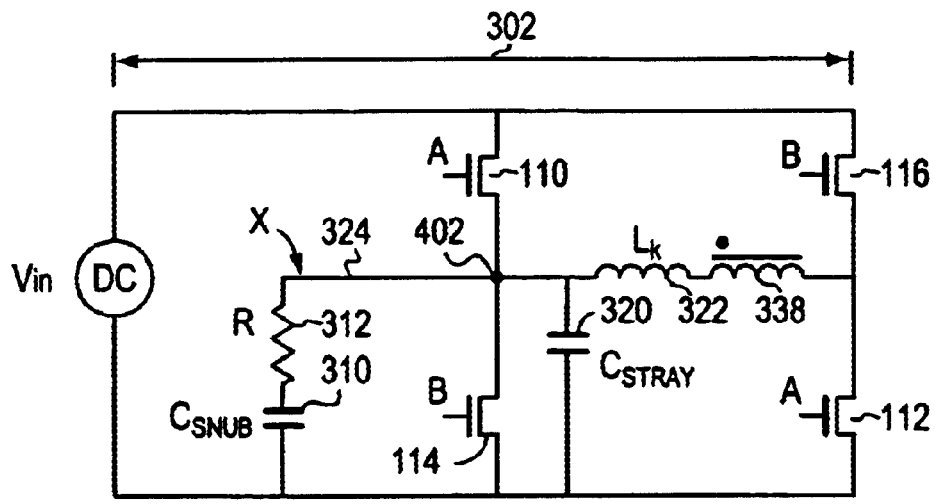
FIG. 3A is a block schematic drawing of the primary circuit of a switching power supply.

Turning now to FIG. 3A, there is shown the primary circuit 302 part of power supply 100. Snubber capacitor 310 and snubber resistor 312 have been added to reduce ringing as switches 110, 114 close and open. A circuit always has stray capacitance and stray inductance, as shown by stray capacitor 320 and stray inductance 322. When the switches open or close a ringing current is set up at a frequency principally determined by the stray capacitance, as represented by stray capacitor 320, and stray inductance, as represented by stray inductance 322. The frequency of the ringing is given by the expression:

$$\text{frequency}=1/(2\pi(C_{stray} L_k)^{1/2})$$

Figure 3B:
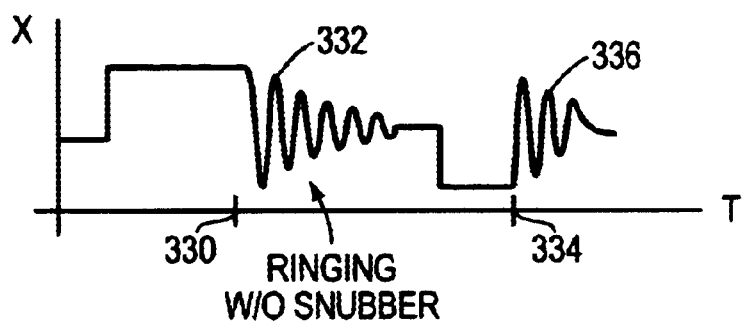
FIG. 3B–FIG. 3C are graphs showing voltage waveforms within a power supply.

Turning now to FIG. 3B, the voltage at point X 324 is shown. Without a snubber capacitor 310 and snubber resistor 312 present, when a switch 110, 114 opens at time 330, a high frequency ringing voltage 332 appears at point X 324. Also, when a switch closes at time 334 a high frequency ringing voltage 336 appears at point X 324. Ringing currents associated with the ringing voltages pass through the primary winding 338 of the transformer and can cause undesired currents in the secondary windings 120, 122 (not shown in FIG. 2A).

Figure 3C:
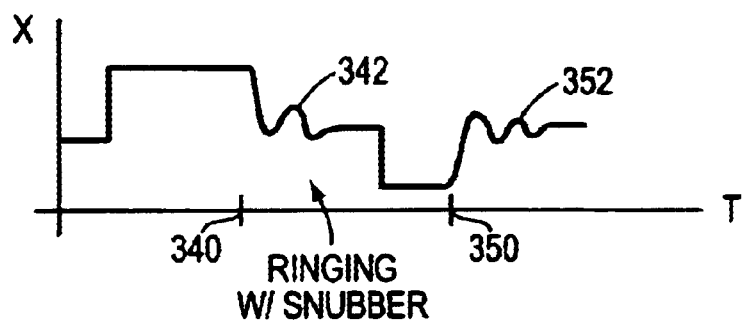

Snubber capacitor 310 and snubber resistor 312 provide a short circuit to the high frequency ringing currents, and so reduce the amplitude of the ringing, as shown in the graph of FIG. 3C. At time 340 a switch 110 114 opens and a reduced ringing voltage 342 is detected at point X 324. Further, at time 350 another switch opens and a reduced ringing voltage 352 appears at point X 324.

A disadvantage of using a snubber capacitor is that electric charge is stored in snubber capacitor 310 each time that it is connected to a voltage source by switch 110 closing when switch 114 is open. The charge is then dissipated in snubber resistor 312 with switch 110 open and switch 114 closing. The dissipation of the charge in snubber resistor is a waste of electric energy, and over time a waste of electric power. The electric power lost in the snubber capacitor 310 and snubber resistor 312 is proportional to the capacitance of snubber capacitor 310, is proportional to the frequency at which the switches open and close, and is proportional to the square of the voltage to which the capacitor is charged on each cycle. As an expression, this power loss is given by:

$$\text{Power Lost} \propto C(V_{in})^2 \text{Freq}$$

Figure 4A:
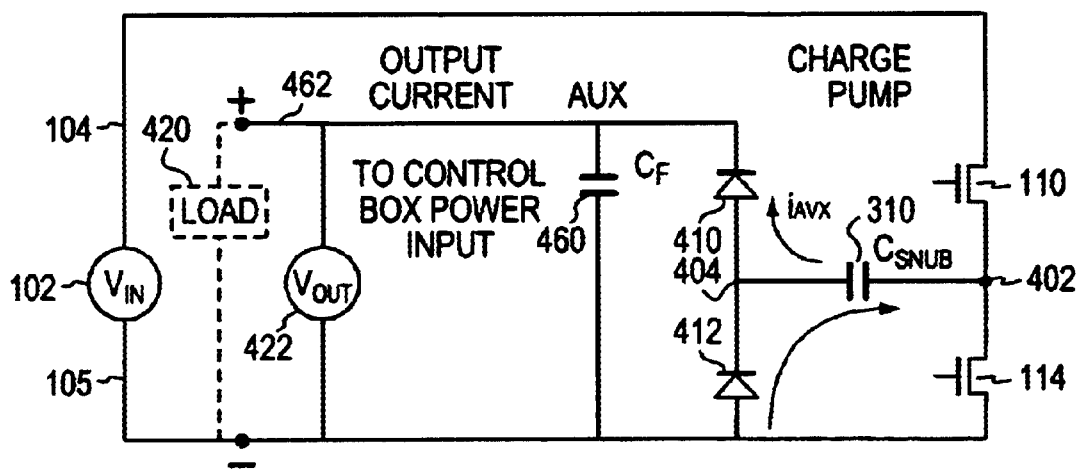
FIG. 4A is a block schematic diagram of the primary circuit of a switching power supply in accordance with the invention.

Turning now to FIG. 4A, the charge pump invention 400 is shown. Snubber capacitor 310 is connected at point 402 between switches 110, 114, and at point 404 to diode 410 and diode 412. Snubber capacitor 310 charges through diode 412 to the input voltage $V_{in}$ 102 when switch 110 is closed and switch 114 is open. Alternatively, when switch 110 is open and switch 114 is closed, discharge of snubber capacitor 310 is through diode 410 and through load 420. The discharge current from snubber capacitor 310 through load 420 supplies useful power to a useful load 420. Load 420 is shown in dashed lines because it is not part of the charge pump invention. The invention is referred to as a "charge pump" because it pumps charge stored in snubber capacitor through a useful load, such as load 420.

Figure 4B:
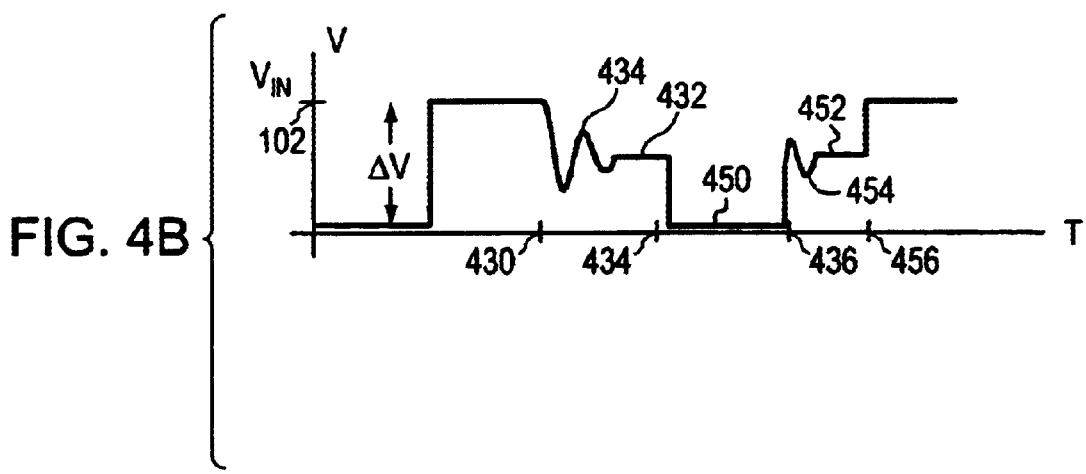
FIG. 4B is a graph showing a voltage wave form within a power supply, in accordance with the invention.

The charge pump output voltage $V_{out}$ 422 is shown in the graph of FIG. 4B. At time 430 switch 110 opens causing the snubber capacitor 310, which had been charged through switch 110 to substantially the voltage of $V_{in}$ 102, to discharge to an intermediate voltage 432. A ringing voltage is developed at point 404 because of stray capacitance and stray inductance in the circuit, however the ringing is damped because of the discharge of snubber capacitor 310 through load 420. At time 434 the switch 114 closes, driving point 402 to substantially the voltage of line 105, and snubber capacitor 310 discharges to a voltage of substantially zero volts 450. At time 436 switch 114 opens, permitting point 404 to rise to an intermediate voltage 452, with some dampened ringing occurring. The ringing is dampened because of the presence of snubber capacitor and load 420, where currents are dissipated in load 420. At time 456 switch 110 closes, permitting snubber capacitor 310 to once again charge to the voltage $V_{in}$ 102.

An advantage of the invention is that the charge stored in snubber capacitor 310 during each cycle of operation of switches 110, 114 is utilized to perform useful work in load 420.

Filter capacitor 460 reduces the ripple voltage in output voltage 422 on line 462, and where the output voltage on line 462 is applied to load 420.

Figure 5:
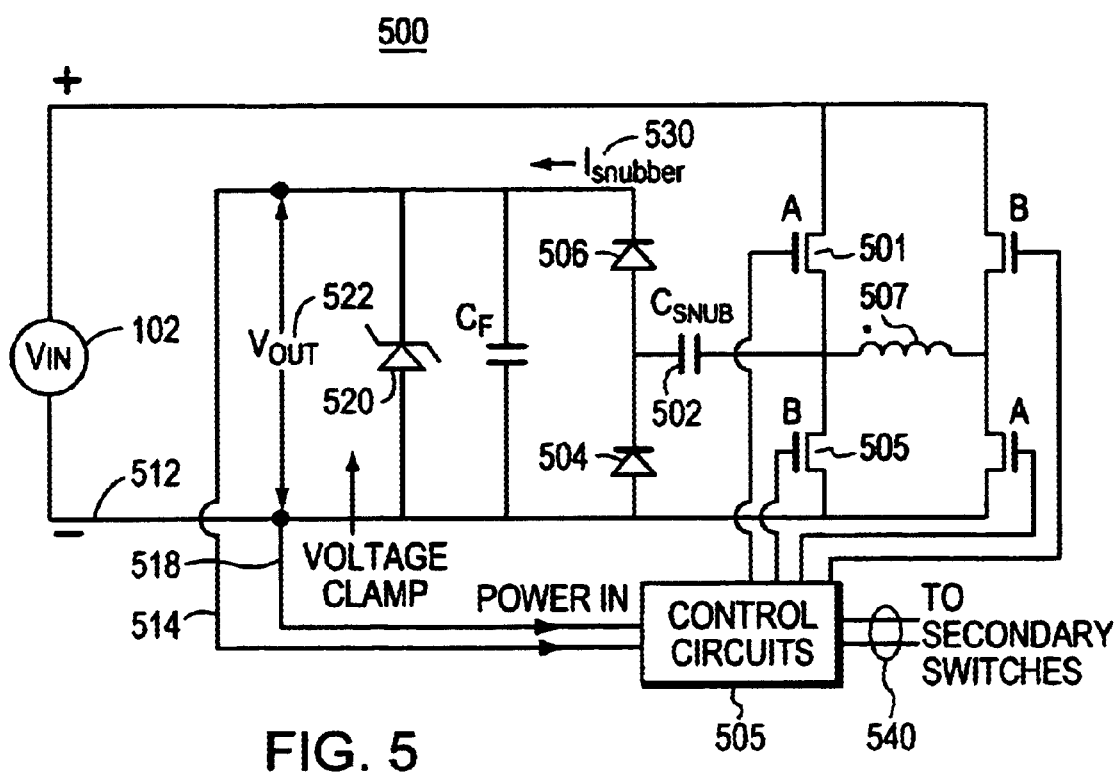
FIG. 5 is a block schematic diagram of a power supply in accordance with the invention.

Turning now to FIG. 5, primary circuit 500 of a power supply is shown, along with control circuits 516. In the exemplary embodiment of the invention shown as primary circuit 500, the snubber capacitor 502 charges through diode 504 when switch 505 is open and switch 501 is closed. With switch 505 open and switch 501 closed, the voltage of point 507 goes substantially to voltage 102, the input voltage between positive input bus 510 and negative input bus 512.

Snubber capacitor 502 discharges through diode 506 when switch 501 is open and switch 505 is closed. With switch 501 open and switch 505 closed, the voltage of point 507 is substantially the voltage of negative input bus 512, and so snubber capacitor 502 discharges through diode 506, through the path along line 514, through the load represented by control circuits 516, and back to negative input bus 512. Line 514 represents line 162 supplying power to control circuits 160 in FIG. 1. Line 518 represents the power return path, not shown in FIG. 1.

Voltage clamp 520 is represented in primary circuit 500 as a Zener diode. It is possible that the average output voltage 522 produced between line 514 and line 512 (or line 518) without a voltage clamp is greater than desired for the load, for example control circuits 516. Including the voltage clamp 520 in the circuit then limits the output voltage to a desired value. Snubber capacitor current 530 is then divided between current flow through load 516 and current flow through voltage clamp 520. In an exemplary embodiment of the invention, a Zener diode is used as voltage clamp 520.

Signal lines 540 connect to the secondary switches (not shown in FIG. 5) such as switch 130 and switch 128 shown in FIG. 1, and switch "not A" and switch "not B" shown in FIG. 2A.

Figure 6:
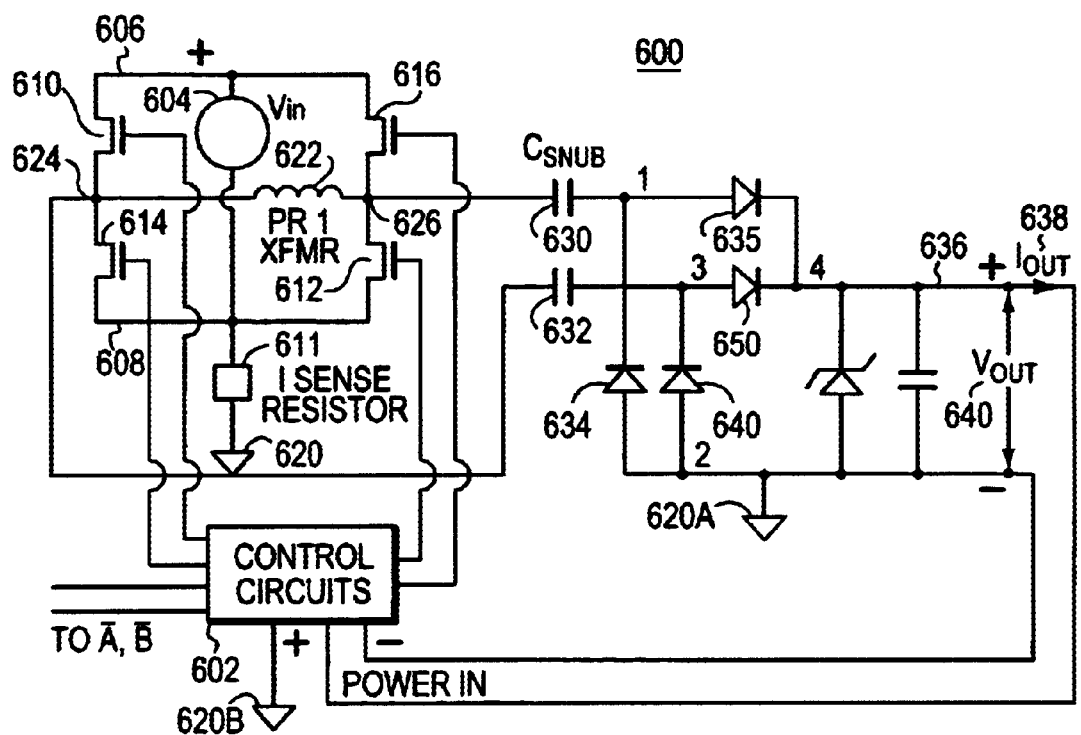
FIG. 6 is a block schematic diagram of a power supply in accordance with the invention.

Turning now to FIG. 6, primary circuit 600 is shown, along with control circuits 602. In the exemplary embodiment of the invention shown as primary circuit 600, input voltage source 604 supplies power through positive input bus 606 and negative input bus 608. Current sense resistor 611 connects negative input bus 608 to system ground 620. When switch 610 and switch 612 close (with switch 614 and switch 616 open) electric current flows from positive input bus 606 through transformer primary winding from point 624 to point 626, and then to negative input bus 608. When switch 614 and switch 616 close (with switch 610 and switch 612 open) electric current flows through transformner primary winding 622 from point 626 to point 624, the opposite direction of current flow when switches 610, 612 are closed.

Snubber capacitor 630 reduces ringing when switches 616 and 612 open and close. Snubber capacitor 632 reduces ringing when switches 610, 614 open and close.

Next, operation of snubber capacitor 630 is described. When switch 612 is open and switch 616 closes snubber capacitor 630 charges from system ground 620A through diode 634, and through closed switch 616 to positive input bus 606.

Alternatively, when switch 616 is open and switch 612 is closed, snubber capacitor 630 is connected at point 626 through closed switch 612 to negative input bus 608, and through current sense resistor 611 to system ground 620. Snubber capacitor 630 then discharges through diode 635 to output bus 636 where the discharge of snubber capacitor 630 generates output current 638 at output voltage 640. Output current 638 flows through the load, represented by control circuits 602, to system ground 620B, and through the system ground path (not shown in FIG. 6) through system ground 620 to complete the discharge path through closed switch 612. System grounds 620, 620A, and 620B are at substantially the same potential, and serve to complete the discharge path of snubber capacitor 630.

Next, operation of snubber capacitor 632 is described. When switch 614 is open and switch 610 closes snubber capacitor 632 charges from system ground 620A through diode 640, and through closed switch 610 to positive input bus 606.

Alternatively, when switch 610 is open and switch 614 is closed, snubber capacitor 632 is connected at point 624 through closed switch 614 to negative input bus 608, and through current sense resistor 611 to system ground 620. Snubber capacitor 632 then discharges through diode 650 to output bus 636 where the discharge of snubber capacitor 630 generates output current 638 at output voltage 640. Output current 638 flows through the load, represented by control circuits 602, to system ground 620B, and through the system ground path (not shown in FIG. 6) through system ground 620 to complete the discharge path through closed switch 614. As mentioned above, system grounds 620, 620A, and 620B are at substantially the same potential, and serve to complete the discharge path of snubber capacitor 650.

Voltage clamp 662 prevents the output voltage 640 from exceeding a desired level. In an exemplary embodiment of the invention, a Zener diode is used as voltage clamp 662.

It is to be understood that the above described embodiments are simply illustrative of the principles of the invention. Various other modifications and changes may be made by those skilled in the art which embody the principles of the invention and fall within the spirit and scope thereof.

What is claimed is:

1. A power supply, comprising:
   a first switch and a second switch to direct electric current flow through a transformer primary winding at a selected end of said transformer primary winding;

a snubber capacitor connected at a first end of said snubber capacitor to said first switch and said second switch at a junction point with said selected end of said transformer primary winding;

an output bus to deliver electric current, generated from discharge of said snubber capacitor, to a load;

wherein said snubber capacitor charges through said first switch when said first switch is closed and said second switch is open thereby connecting a second end of said snubber capacitor to a positive input bus of said power supply, and said snubber capacitor discharges through said load when said first switch is open and said second switch is closed thereby connecting said second end of said snubber capacitor to a negative input bus of said power supply.

2. A power supply, comprising:

a first switch and a second switch to direct electric current flow through a transformer primary winding at a selected end of said transformer primary winding;

a first junction point having a first end of said first switch, a first end of said second switch, and said selected end of said transformer primary winding connected thereto;

a second end of said first switch connected to a positive input bus of said power supply;

a second end of said second switch connected to a negative input bus of said power supply;

a snubber capacitor connected to said first junction point at a first end of said snubber capacitor;

an output bus to deliver electric current, generated from discharge of said snubber capacitor, to a load;

a second junction point, said second junction point having a second end of said snubber capacitor connected thereto, said second junction point having a first end of a first diode connected thereto and a second end of said first diode connected to said negative input bus, and a first end of a second diode connected to said second junction point and a second end of said second diode connected to said output bus;

wherein said snubber capacitor charges through said first switch when said first switch is closed and said second switch is open, and said snubber capacitor discharges through said load when said first switch is open and said second switch is closed.

3. The apparatus as in claim 1 or claim 2 further comprising:

a voltage clamp connected to said output bus to prevent said output bus from rising to a voltage exceeding a clamp value of voltage.

4. The apparatus as in claim 3 further comprising:

said voltage clamp is a Zener diode.

5. The apparatus as in claim 1 or claim 2 further comprising:

a filter capacitor connected to said output bus to reduce ripple voltage in an output voltage.

6. The apparatus as in claim 1 or claim 2 further comprising:

a control circuit, and electric power is supplied to said control circuit by discharge of said snubber capacitor.

7. The apparatus as in claim 1 or claim 2 further comprising:

a third switch and a fourth switch to direct electric current flow through said transformer primary winding at a second end of said transformer primary winding;

a second snubber capacitor connected at a first end of said second snubber capacitor to said third switch and said fourth switch at a junction point with said second end of said transformer primary winding, and said output bus to deliver electric current, generated from discharge of said second snubber capacitor, to said load;

wherein said second snubber capacitor charges through said third switch when said third switch is closed and said fourth switch is open thereby connecting a second end of said second snubber capacitor to said positive input bus of said power supply, and said second snubber capacitor discharges through said load when said third switch is open and said fourth switch is closed thereby connecting said second end of said second snubber capacitor to said negative input bus of said power supply.

8. A power supply, comprising:

a first switch and a second switch to direct electric current flow through a transformer primary winding at a selected end of said transformer primary winding;

a snubber capacitor connected at a first end of said snubber capacitor to said first switch and said second switch at a junction point with said selected end of said transformer primary winding;

an output bus to deliver electric current, generated from discharge of said snubber capacitor, to a load;

wherein said snubber capacitor charges through said first switch when said first switch is closed and said second switch is open thereby connecting a second end of said snubber capacitor to a positive input bus of said power supply, and said snubber capacitor discharges through said load when said first switch is open and said second switch is closed thereby connecting said second end of said snubber capacitor to a negative input bus of said power supply;

a third switch and a fourth switch to direct electric current flow through said transformer primary winding at a second end of said transformer primary winding;

a second snubber capacitor connected at a first end of said second snubber capacitor to said third switch and said fourth switch at a third junction point with said second end of said transformer primary winding, and said output bus to deliver electric current, generated from discharge of said second snubber capacitor, to said load;

wherein said second snubber capacitor charges through said third switch when said third switch is closed and said fourth switch is open thereby connecting a second end of said second snubber capacitor to said positive input bus of said power supply, and said second snubber capacitor discharges through said load when said third switch is open and said fourth switch is closed thereby connecting said second end of said second snubber capacitor to said negative input bus of said power supply.

9. A method of operating a power supply, comprising:

directing electric current flow through a transformer primary winding at a selected end of said transformer primary winding by a first switch and a second switch;

connecting a snubber capacitor at a first end of said snubber capacitor to said first switch and said second switch at a junction point with said selected end of said transformer primary winding;

delivering electric current by an output bus to a load, said electric current generated from discharge of said snubber capacitor;

wherein said snubber capacitor charges through said first switch when said first switch is closed and said second switch is open thereby connecting a second end of said snubber capacitor to a positive input bus of said power supply, and said snubber capacitor discharges through said load when said first switch is open and said second switch is closed thereby connecting said second end of said snubber capacitor to a negative input bus of said power supply.

10. A power supply, comprising:
- a first switch and a second switch to direct electric current flow through a transformer primary winding at a selected end of said transformer primary winding;
- a snubber capacitor connected at a first end of said snubber capacitor to said first switch and said second switch at a junction point with said selected end of said transformer primary winding;
- an output bus to deliver electric current, generated from discharge of said snubber capacitor, to a load;
- means for charging said snubber capacitor through said first switch when said first switch is closed and said second switch is open thereby connecting a second end of said snubber capacitor to a positive input bus of said power supply; and means for discharging said snubber capacitor through said load when said first switch is open and said second switch is closed thereby connecting said second end of said snubber capacitor to a negative input bus of said power supply.

* * * * *